United States Patent [19]
Yomtoubian

[11] Patent Number: 5,047,874
[45] Date of Patent: Sep. 10, 1991

[54] TECHNIQUE FOR CERTIFYING DISK RECORDING SURFACE

[75] Inventor: Ruben Yomtoubian, Saratoga, Calif.

[73] Assignee: Unisys Corp., Detroit, Mich.

[21] Appl. No.: 332,637

[22] Filed: Mar. 31, 1989

[51] Int. Cl.$^5$ ............................................... G11B 5/02
[52] U.S. Cl. ........................................ 360/25; 360/25; 360/31; 324/210; 369/53; 369/58
[58] Field of Search ................ 360/25, 31; 324/212, 324/210; 365/200; 369/53, 58

[56] References Cited

U.S. PATENT DOCUMENTS

| | | | |
|---|---|---|---|
| 3,633,187 | 1/1972 | Proctor et al. | 360/25 X |
| 3,659,195 | 4/1972 | Cardozo et al. | 324/212 X |
| 3,761,905 | 9/1973 | Hollstein et al. | 360/25 X |
| 3,781,835 | 11/1973 | Dion | 360/25 X |
| 4,656,420 | 4/1987 | Felleisen et al. | 324/212 X |

Primary Examiner—Roy N. Envall, Jr.
Assistant Examiner—Hung H. Bui
Attorney, Agent, or Firm—John J. McCormack; Mark T. Starr

[57] ABSTRACT

Techniques for certifying recording sites (bit sites) on magnetic recording disks wherein test recording patterns are recorded along disk tracks: first in an analog mode, then in a digital mode; concluding in a full digital test that simulates customer operation.

11 Claims, 1 Drawing Sheet

| | Test | Sites | Criteria | Designation |
|---|---|---|---|---|
| STEP I | Analog | all | MB up to 65%;EB at 35%+ | --> "Defect" |
| | | | MB up to 78%;EB at 25%+ | --> "Suspect" |
| STEP II | Brief Digital | only "Suspects" from STEP I | MB up to 55% | --> "Verified Defect" |
| | | | "passing Suspects" | --> "Secondary Suspects" |
| STEP III | Full, Extensive Digital | only "Secondary" Suspects | MB -- (nominal) (EB -- nominal) | --> "Verified Defects" |
| | | | "passing?" | --> released (assume acceptable) |

TECHNIQUE FOR CERTIFYING DISK RECORDING SURFACE

This case relates to magnetic disk recording surfaces; and, more particularly, to improved techniques for certifying such.

BACKGROUND FEATURES

In today's disk storage technology, there is great demand for fast data transfer rates and high memory capacity/density. All disk drive subsystems (DD) are designed to tolerate inconsistencies in media coating (defects), otherwise loss of data or increased response time would result. In order to mask the effect of small defects in media coating, one must locate these small defects and direct the DD subsystem to skip over them ("skip assignment"). Many passes of Write/Read test with various number of test patterns are required in order to locate defects and "assign" them, so that the defective areas of a disk will not be accessed during normal user operations.

It would take many days of test time to locate all the defects on a disk surface. Thus, a special "analog media tester" can be used to locate and "assign" defects so those areas with insufficient magnetic readout will not be accessed during normal digital read/write operations (viz. a "media screener", or "head/media tester"). A related "digital tester" can also be used.

A disk drive "analog tester" can so test more area of a disc face at higher bit density than a "digital tester". "analog tester" hardware/software parameters can be adjusted to detect different sizes of media defects. The tighter these parameters, the smaller the (size of) the defects detected. "analog tester" parameters should be set tight enough to detect and assign most of the defects detectable during a user operation of a disk drive (cf. ensure that no more errors/defects will occur during normal operation of a disk subsystem than is promised). In order to make sure that the "analog tester" has detected all such defects, a "digital" test can be run via a host computer after the analog.

It is an object hereof to teach improved techniques for so "certifying" magnetic disk recording surfaces: e.g., techniques that may be used (e.g., see U.S. Pat. No. 3,633,187 re certification of tape) by manufacturers and users of disk storage subsystems to enhance data integrity and test process yield of disk subsystem.

It is a further object to so improve disk certification by and mapping magnetic disk media defects making the process more efficient, less expensive and briefer.

These and other features and advantages of the present invention will be appreciated by workers as they become better understood by reference to the following detailed description. In this description it will generally be understood that means are constructed and used as presently known in the art, except where otherwise specified.

And, except as otherwise specified, that all materials, methods and devices and apparatuses herein are to be implemented by known expedients according to present Good practice.

EXAMPLE 1

"Simple Certification"

Figure 1:
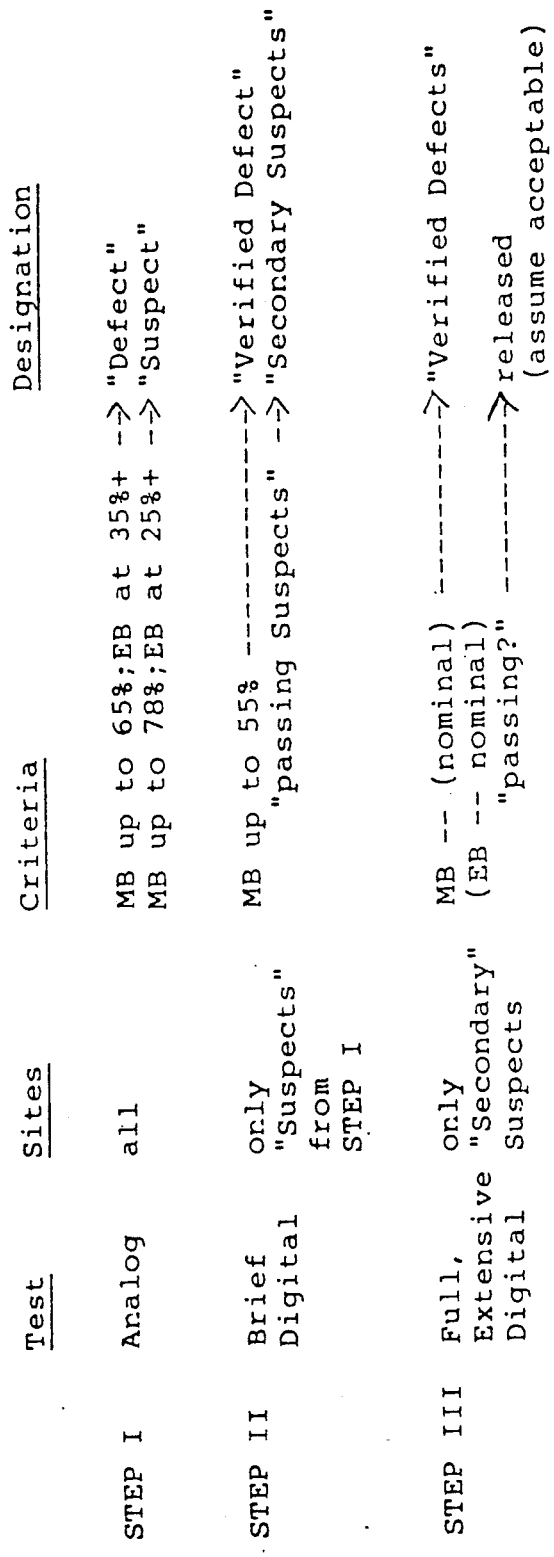
FIGURE 1 illustrates a summary of the "three tests" for certifying recording sites on a magnetic recording disk.

Following (Table I) is an outline of a relatively simple technique for certifying magnetic disk recording surfaces.

Workers will recognize this as involving, first, a relatively simple "analog test"; then, a "brief digital test" at a lower threshold level to detect additional "defects" that might have been missed by the "analog test"; then a "full digital test" is run to detect further defects that may have been missed. This "full digital test" simulates a user's workload (e.g., in a user's house).

Workers recognize that, as bit density and data transfer rate increase, the number of defects missed by an "analog test" increases. Thus, the number of errors detected during normal operation of the disk subsystem increases, unless an alternative method of defect assignment is implemented.

TABLE I

1. Analog Test - Designate as "Fail" any site that doesn't pass either criterion.
   MB: 0-70% readout signal ampl.
   EB: 27-100%
2. Full Digital Test - Assign new "Fail-sites"-but test only sites that didn't fail.
   TH: Nominal
cf. "MB": "missing bit" = readout unsatisf.-low after write
   EB: "extra-bit" = readout unsatisf.-high after erase
   TH: readout threshold amplitude Workers recognize that the tighter the "analog tester" thresholds, the smaller the size of the defects detected, the larger the number of defects detected, and the smaller the number of additional defects detected during the "digital test".

A large percentage of defects detected in "analog test" might never cause a data check under normal digital operation. Yet, in order to ensure data integrity during normal operation (of a disk drive) all analog-detected defects are "assigned" (i.e., designated) as "Fail-sites".

Regarding Table I, workers will recognize that the tests listed each involve recording a prescribed test pattern or patterns (e.g., sinusoid) along all tracks of the subject magnetic disk surface and then, according to readout amplitude derived from the bits so written, applying certain standards of acceptability.

For instance, in the analog test (No. 1), the "missing bit" portion MB involves a "failure" criterion of 0-70% of a nominal readout amplitude, whereby that bit spot is assigned as a "Fail site" (workers will recognize that "nominal amplitude" is a threshold level that is higher than "noise level" and a bit lower than amplitude which is "acceptable" to the trade). Workers will also recognize that a "missing bit" can result from too little magnetizeable material at the site (e.g., a bare, uncoated spot), and that an "extra-bit" can result from an excess of magnetizeable material there. Similarly, the "extrabit" test EB involves assigning "Fail-site" to any bit that is so written and is then erased (according to a prescribed standardized method) and is then reread—"failure" involving a readout that is over 27% of a nominal amplitude value.

This analog test uses high-density or high-frequency patterns that will pick out grossest defects.

In summary, this test involves writing, then read out, then erasing, then read out,—while assigning FAIL where the MB or EB test is not passed.

In step No. 2 ("digital test") all track sites are written on digitally and then read out with "failures" defined as those sites giving a read out that is less than "nominal" amplitude. As a frame of reference, workers may be interested to know that with an oxide disk and ferrite heads, each magnetic recording surface or face (having a total of 160 million bit sites) might typically have about 300 defects, or "failure sites", discovered in the analog test.

EXAMPLE 2

Add Brief Marginalized Digital Pre-Test

The marginalized digital test screens bits at higher threshold levels than the nominal threshold levels (i.e., here nominal threshold=35% to 40%; marginalized threshold level=55%).

Ex. 1 is replicated, except that a "brief marginalized digital pre-test" is introduced between analog and full digital testing, principally to screen-out more "Fail" sites in a test regimen that is quicker and less expensive than the "full digital" test. Here, one pass with a single write head and a single test pattern is run over all disk tracks. Typically, where the analog test identified about 300 Fail-sites, this brief digital test might identify about 25 more Fail-sites.

Table II illustrates exemplary results of running these three (3) tests with two different disk drives M-0, M-2, with results also given for a single disk surface of M-2. Note that the track density/bit density of M-2 disk surface is twice that of M-0, while threshold levels are the same.

TABLE II

Example of Disk Defects and Capacity

| Drive type | M-0 | M-2 | DS-2 |
|---|---|---|---|
| Drive capacity | 1.2 GB | 2.4 GB | 160 MB/surface |
| Analog tester threshold | MB = 70% EB = 27% | MB = 70% EB = 27% | |
| Total number of defects per drive | 2000 | 5000 | 350 defect/surface |
| Number of defects detected via analog | 1900 | 4400 | 300 defect/surface |
| Additional defects detected at digital test @55% | 5 | 400 | 25 defect/surface |
| Additional defects detected at full digital (nominal TH) | 3 | 100 | 6 defect/surface |

The "full digital test" can be run at the factory to simulate what a typical user will do in practice (e.g., many write/read passes vs. Step 1A, and many (similar) test patterns, similar threshold; (e.g., 35-40% of a nominal output amplitude—note: a few more defects may be detected at "nominal" digital thresholds—vs. higher digital thresholds—because of changes in filter characteristics.

This higher cost, more time-consuming step is most certain to screen defects (of more write/read passes, with several varied test patterns).

Step #2 is thus a more rigorous final checkout looking for "no failures or defects" (ignoring the failures found in the first and second tests).

Step #2 is a full extensive write/read out procedure repeatedly passing every single bit site on the recording surfaces (whereas the prior "brief" digital test gives only one pass, with one pattern).

Thus Step #2 is the last, most extensive digital pass and the most meaningful one; the preceding tests offer more economical ways of finding and designating the "grosser" Fail sites. This "full digital test" is so time-consuming and expensive that it makes economic sense to precede it with the brief digital test and to, further, precede the brief digital test by the even less expensive and quicker analog test.

The patterns used in digital test are designed to simulate "worst-case" conditions (e.g., maximum phase-shift, or maximum signal distortion from read/write filters). "Hex 11224433" is one such test pattern; there are other, as artisans will recognize.

Below Table II-A gives "worst case" test patterns for magnetic disks (for a "2,7 code" recording). To locate all defects, I prefer to rotate these patterns and include them in the digital testing.

TABLE II-A

"Worst case" patterns; assume ½ 2.7 code pattern:
0000100000100100000001;

(1) Hex pattern for MuFo testing (can rotate these):
 (1-a) 308CD198CC66CC2334663319B33333333333333199999B
 (1-b) 6119A33198CD984668CC6633666666666666663333336
(2) Hex pattern for generating Max. peak shift (can rotate also):
 AF19E33A678AF19E33A678F19E33A678AF19E33A678
(3) Hex patterns for high frequency:
 492492492 and/or 924924 and/or 249249
(4) Hex patterns for "DC FREE":
 4B4B and/or B4B4 and/or 2525 and/or 5252 and/or 9696

EXAMPLE 3

Improved Certification, Using "Suspect Sites"

TABLE III

A. Multiple Test: Analog

| | | |
|---|---|---|
| 1a | min. MB (e.g., 0-65%) | designate Fail sites |
| 1'a | increased MB (e.g., 66-70%) | designate Suspect sites |
| 1"a | increased MB (e.g., 71-78%) | designate poss-Suspect |
| 1b | max. EB (e.g., 35-100%) | designate Fail sites |
| 1'b | less EB (e.g., 30-34%) | designate Suspect sites |
| 1"b | less EB (e.g., 26-30%) | designate poss. Suspect |

B. Brief Digital Test:

| | |
|---|---|
| test only Suspect sites (and poss. Suspect sites?) | designates as new V-Fail site if doesn't pass |
| e.g., TH: 55% | |

C. Full Digital Test:

| | |
|---|---|
| test only Suspect (and poss. Suspect sites) | designate new V-Fail sites or de-classify (now "Good") |
| TH: Nominal | |

The Qualification (or certification) tests run in Table III will be understood as essentially the same as those described above for EXAMPLES 1 and 2 except as otherwise stated. Here, it will be seen that the tests are modified. For instance, the analog test is designed to given "Suspect" sites as well as "Fail" sites; the "digital" tests are performed only on "Suspect" sites.

Step A, the multiple analog test, involves two phases, as in Table I; that is, "missing bit" MB and "extra bit"

EB. However, each phase is broken down into a "loose" criterion designed to designate a "Fail site" (cf., Step 1a, "minimum missing bit" and Step 1b, "maximum extra bit") and tighter criteria ("Suspect", "possible-Suspect").

Thus, as in Table I, a bit is written and then readout, and if readout does not yield a certain minimum amplitude (e.g., 0-65% of a nominal value), the site is designated as "Fail". This same readout is designated as "Suspect" (i.e., "Suspect site") if it is only slightly higher (e.g., 66-70%); and is designated "possibly-Suspect" if it is a bit higher than "Suspect-level" (e.g., 71-78%).

Similarly, the test bit is then erased and again readout, and if readout rises above a prescribed minimum (e.g., 35% of a nominal value), the site is designated "Fail". Of course, as with Table I, any site that is designated "Fail" in a first instance is not retested later to see if it will fail in a second instance.

In this phase of the testing, however, the MB and EB portions are further broken down into one or several sub-phases of increasing strictness, and sites which do not pass these enhanced criteria are designated "Suspect" (not Fail)—it being understood that already-identified Fail-sites are passed over.

Thus, in Step 1'a, the stricter MB tests may, for instance, characterize readout falling between 66-70% of nominal as indicating a "Suspect site". And, if desired, an even stricter criterion may be applied, such as 71-78% readout amplitude giving a designation of "possible Suspect", and so forth. Of course, workers will understand that this write/readout operations need only be performed once, at each given site, with automated test equipment applying the various MB criteria and automatically giving "Fail", "Suspect" or "possible Suspect" designations based on a single test readout. These site designations may be recorded in a suitable memory as workers recognize—e.g., to be used for other purposes as well.

And similarly for the EB tests, the "stricter" criteria may, for instance, comprise 30-34% readout amplitude resulting in a "Suspect" characterization. Where desired, one or several further, stricter tests and characterizations may be given, for instance, a 26-30% readout amplitude resulting in "possible Suspect" designation. As mentioned, once a bit site is identified as Fail (or verified Fail), it is passed-over in subsequent testing steps (i.e., assumed unusable).

The Brief Digital test, is conducted essentially as in EXAMPLE 2, except that it is run only on "Suspect" sites (and on "possible Suspect" sites in some cases)—e.g., one can test the "Suspect" and "possible Suspect" sites once and then re-test only the "possible Suspect" sites with stricter criteria. And, here, sites that do not give a prescribed minimum readout (e.g., 55% of nominal amplitude) are designated as "new V-Fail sites".

Workers will recognize that these "V-Fail sites" are characterized differently from the aforedescribed "Fail" sites, but this is only for classification purposes; both will be ignored (i.e., not accessed on the recording surface of the finished disk) in user operation.

The third step, "full digital test", is performed as before, except that only "Suspect" sites and "possible Suspect" sites are tested. And those that fail to give a prescribed nominal readout amplitude are designated as "new V-Fail sites"—with all "Suspect" and "possible Suspect" sites that do pass this criterion being declassified and thus being restored as "Good" recording sites as known in the art.

Workers will note that there is considerable advantage (e.g., saving of time, testing time and equipment and thus saving of expense, as well as avoidance of mischaracterizing a Fail site) in a certification protocol like that of Table III according to the invention. Thus, the digital testing, which is quite time-consuming and expensive, may be radically reduced, in that it only need deal with Suspect (possible Suspect) sites, and not with Fail sites, from the preceding analog tests. Similarly, the full digital test will save even more time by dealing only with "Suspect" sites—both digital tests assuming conclusively that the definite Fail sites uncovered by the preceding analog test are to be unequivocally assumed as real defect areas (note a higher confidence may be had here, in that the analog MB, EB criteria were more strict than otherwise need be the case).

In all certification protocols (EXAMPLES 1, 2, 3) workers may assume that a memory matrix is allocated for each bit site designated as "Fail" or "Suspect", etc., and that such a location may give the address, track location and "Fail" or "Suspect", "possible Suspect" etc. designation for that bit site. Of course, when a "Fail" or "Suspect" (possible Suspect) site is retested and found to be "Good", such designations may then be erased and eliminated from consideration. The upshot, after completion of the entire certification protocol, will typically yield a list of "Fail" sites giving their locations on the disk, as known in the art.

The technique of EXAMPLE 3 will be recognized as detecting and assigning defects more effectively, with minimal impact on process yield. It can also reduce the number of correctable and uncorrectable errors found during customer operation, thus increasing the "R+ rating" of a large disk storage subsystem.

EXAMPLE 4

Further Improvement

The following is a further improvement on Ex. 3 as a defect assignment procedure, one that can enhance the data integrity of a disk subsystem with minimum impact on process yield. This procedure may be understood as applied to certification of 14" disk drives (it could be modified for 8" and 5¼" disk subsystems).

TABLE IV

| | |
|---|---|
| 4-1. | Designate "larger" defects ("loosest" criteria): Designate as "Fail" all recording sites of disk that generate signals below the analog tester (low) threshold level. |
| 4-2. | Designate "Suspects" ("tighter" criteria): Designate as "Suspect" defects all bit sites on disk that give output below tighter analog test thresholds (smaller defects), yet do not cause the HDA to be rejected (i.e., head - disk assemblies don't exceed engineering test specifications). This means that one will classify as "Suspect" all defects that are detected via the tighter analog thresholds and may cause the HDA to be rejected. "Suspect" defects are candidates for digital test later. |
| 4-3. | Test "Suspects" via "brief digital test": Test all "Suspect" defects via digital test at high thresholds and margins (i.e., run one quick digital test on "Suspect" location(; then designate as "Fail sites" all those that don't pass. |
| 4-4. | Test "Suspects" further via "full digital test": Test all remaining (non-Fail) "Suspect" defects via full digital test at nominal thresholds/margins (i.e., run repeated extensive digital tests on "Suspect" defect location); then designate as "Fail |

TABLE IV-continued sites" any "Suspect" areas that don't pass. Those that pass become "Good".

4-5. Perform "worst case" digital test to validate data integrity.
a - Test the 3 innermost disk cylinders with 5 passes of write/read test, running all the "worst case" test patterns (e.g., 4DD 4DB). No additional defects should be detected.
b - Reevaluate the HDA if more than 1 defect is thus detected.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other related magnetic recording systems. Also, the present invention is applicable for qualifying other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. A method of designating recording defect areas on recording surface portions of a magnetic recording disk, this method comprising:

STEP 1: establish first failure criteria for a missing bit, namely FIRST CRITERIA, and for extra bits, namely SECOND CRITERIA, and impress one or several analog signal patterns on all recording sites of said disk surface portions, read them, erase them and then re-read them, then designate as Fail-sites all recording sites that do not pass any said criteria and record such in memory means;

STEP 2: next establish alternate digital criteria and digitally write, once, on all said recording sites except said Fair-sites, with worst-case patterns, and read-out thereafter, designating as Fail-sites recording sites that do not pass said digital criteria and do not yield a prescribed nominal read-out amplitude;

STEP 3: then establish final full digital criteria and digitally write and read, repeatedly, on all recording sites except those designated FAIL, with several varied worst-case patterns, designating as FAIL those recording sites that do not pass said final full digital criteria and recording such in said memory means; said FAIL-designated sites being made available for the user of the disk.

2. The method of claim 1, wherein said STEP 1 analog test-analysis mode is repeated at least once, using slightly tighter criteria, with all recording sites that fail those tighter criteria being designated as Suspect, and such recorded in said memory means; and wherein STEP 2 is performed only on said Suspect-sites, designating those that do not pass as FAIL, and recording such in said memory means.

3. The method of claim 2, wherein at least two stages are involved in the STEP 1 whereby first-level missing bit and first-level extra bit criteria are used, as well as more rigorous second-level missing bit and second-level extra bit criteria, and wherein sites not passing said second-level criteria are designated: Suspect.

4. The method of claim 3, wherein the STEP 3 digital test-analysis is performed only upon Suspect sites not already designated FAIL, with those not passing being designated FAIL.

5. The method of claim 4, wherein the STEP 3 digital test-analysis is performed only upon those Suspect sites from STEP 1 that are not designated FAIL in step 2, with sites not passing being designated FAIL, and such being recorded in said memory means.

6. The method of claim 5, wherein at least one other test-analysis stage is added to the STEP 1 analog step, this third stage involving third-level missing bit criteria and third-level extra bit criteria which are still more rigorous than said second-level criteria; and wherein sites not passing said third-level criteria are designated Possible-Suspect, with such being recorded in said memory means.

7. The method of claim 6, wherein the STEP 2 digital test-analysis is performed only on sites designated Suspect and Possible-Suspect, with sites not passing the associated digital criteria being designated as FAIL, and such being recorded in said memory means.

8. The method of claim 7, wherein the STEP 3 full digital test-analysis is performed only on sites designated Suspect and Possible Suspect and not already designated FAIL, with these sites which do not pass being designated FAIL, and such recorded in said memory means, and with all said Suspect and Possible-Suspect sites that do pass either STEP 2, or STEP 3 being re-designated as GOOD recording sites and such being indicated in said memory means.

9. The method of claim 7, wherein the STEP 3 digital test-analysis is performed only the Suspect and Possible Suspect sites from STEP 1, with those not passing the associated criteria being designated FAIL and such recorded in said memory means.

10. The method of claim 9, wherein all Suspect and Possible Suspect sites satisfying the STEP 3 criteria are re-designated as GOOD recording sites, with such being indicated in said memory means.

11. The method designating recording areas on a magnetic recording disk as defective or suspect for prescribed magnetic recording and read-out, this method comprising:

performing a First analog-write/read test of all such areas and designating areas giving less than a FIRST read-out amplitude as DEFECTIVE and recording this in Memory;

performing a First analog-erase/read test of all such areas and designating areas giving more than a SECOND read-out amplitude as DEFECTIVE and recording this in Memory, performing a Second analog-write/read test of all such areas and designating areas giving less than a THIRD read-out amplitude as SUSPECT and recording this in Memory, said THIRD amplitude being greater than said FIRST;

performing a Second analog-erase/read test of all such areas and designating areas giving more than a FOURTH read-out amplitude as SUSPECT and recording this in Memory, said FOURTH amplitude being less than said SECOND;

performing a brief digital write/read test of only areas designated SUSPECT and designating areas giving less than a FIFTH read-out amplitude as VERIFIED DEFECT and areas giving more than said FIFTH read-out amplitude as POSSIBLY SUSPECT and recording this in Memory; and performing an extensive digital write/read test of only said POSSIBLE SUSPECT areas and designating areas which give less than a SIXTH read-out amplitude as VERIFIED DEFECTIVE and recording this in Memory.

* * * * *